March 27, 1945.            J. M. TRENEER            2,372,406
PACKAGE AND METHOD OF MAKING SAME
Filed July 12, 1941

Inventor:
Joseph Maurice Treneer.
By
Attys

Patented Mar. 27, 1945

2,372,406

UNITED STATES PATENT OFFICE 2,372,406

PACKAGE AND METHOD OF MAKING SAME

Joseph Maurice Treneer, Elkhart, Ind., assignor to Miles Laboratories, Inc., Elkhart, Ind., a corporation of Indiana Application July 12, 1941, Serial No. 402,247

8 Claims. (Cl. 99—152)

My invention relates to method of packaging powdered or comminuted materials and the package produced thereby.

The problem to which my present invention is addressed is a general one as will be appreciated by those skilled in the art. As a specific example which well illustrates the problem and exhibits the nature and advantages of my invention, I shall refer to the matter of supplying coffee (beverage) to the defense forces. It is difficult to brew coffee in the field and supply it to men engaged in maneuvers. To meet the chief difficulty it has been proposed to prepare a powdered coffee extract. This is prepared by roasting the bean, grinding or macerating it and steeping in hot water or other extracting liquid to prepare a brew or extract which is then evaporated to a solid. This is preferably done by the use of low pressure evaporation. The solid material may be granulated to a relatively fine powder by the use of a suitable solvent and evaporating procedure.

The resultant powder is a brown material somewhat gritty to the feel and quite sticky when squeezed between the fingers. If allowed to stand in the air it loses flavor, hardens and deteriorates. Hence it is desirable to put it in a hermetically sealed contained and expose it as little as possible.

I investigated the possibility of tabletting the powder as I conceived that it might be more easily handled and packaged in tablet form. But I was disappointed to find that tablets of this powder when dropped into hot water do not readily dissolve. Quite to the contrary the tablet when wetted appears to form a gelatinous surface which is sticky and gummy and which makes the use of tablets quite unattractive.

I found that the only feasible way to secure solution of the tablets to make the desired beverage was to crush them again to the powder form and then the solution was satisfactory, rapid and complete.

Therefore, I conceived the solution of the problem to lie in the following: First compress or tablet the powder into substantially flat tablets, i. e., solid or self sustaining bodies. They need be only firm enough to sustain their own form against breakage and wastage in handling but the more compact the greater saving of space. The limits of compactness were found to depend upon several factors which will be explained later. Second, seal the tablets, either individually or in multiples in an air and moisture tight envelope. This envelope must meet several conflicting requirements as will later appear, but above all it must be capable of being sealed readily and cheaply and the seal and the body of the envelope must remain tight against air and moisture to a very high degree. And it must remain so and yet be capable of withstanding the next step.

Third, crush the tablet inside the envelope thereby bringing the coffee extract (or tabletted material) back to powder form within the envelope. This requires the envelope to have rather remarkable mechanical and fluid tight properties, but I have discovered how this may be effected.

The requirements upon the envelope are diverse and severe. First the sheet stock of which the envelope is to be made, and in fact the envelope itself, must be impermeable and impervious to moisture and to air or other gas. Next, the sheet stock as well as the envelope as a whole must remain so under the punishment inflicted upon it by the crushing of the tablet in the envelope.

The stock must be capable of making a permanently tight joint and the joint must remain tight under the punishment of crushing the tablet in the envelope. The package should be attractive and should be easy to open. It must not soften or weaken if exposed to moisture or usually encountered liquids.

And above all low cost is desired. These requirements are severe, but by the use of proper material, and by the disposal of the material in a suitable manner they can be met.

The envelope may be made of a pliable stock which is capable of junction by heat and pressure. There are various materials which could meet this requirement. Tin and its alloys are capable of fulfilling this requirement, but they are too expensive and must be made in too heavy a gauge. Lead and some of its alloys have similar capabilities. Numerous organic materials, such as cellulose derivatives will form thermoseals, but generally, in addition to other unfavorable characteristics they are rendered undesirably brittle by such operation. Cellulose derivatives by themselves are not in general stable enough for the service and abuse to which the envelope here contemplated is subjected, although I conceive that for certain less severe requirements some of them might be quite satisfactory.

I conceive also that the container may be made of sheet metal and the enclosed solid be reduced to powder by work done through the walls of the container.

According to the preferred form of the invention, I employ a composite sheet stock consisting of thin sheet metal, preferably aluminum foil, coated on one side with a tightly adhering coating of "Pliofilm," a tough strong rubberlike material (a hydrochloride of rubber), or its equivalent. This coating may be any other tough film forming material which is thermosealing, impervious to moisture, capable of withstanding high atmospheric temperature (120° F.), non-porous, strong and somewhat stretchable.

Two sheets with the "Pliofilm" coated sides facing each other are laid on the opposite flat sides of the tablet to be enveloped. The tablet itself is a circular disc-like solid, preferably with corners slightly rounded. The tablet is preferably of a diameter from about 3 to about 10 or more times its thickness for best results. The margins of the coated sheets are pressed together by heated dies or platens having registering recesses formed in the surfaces in order to receive the tablet without pressure. The marginal portions of the dies or platens are preferably corrugated in order to stretch the material tight. The platens by heat and pressure bond the margins of the sheets together. Each sheet is stretched over its half of the tablet, leaving the appropriate part of the sheet stretched flat over the flat side of the tablet. This provides a packaged tablet with the seal of the envelope lying in the median plane of the tablet, and a double tapered annular space about the edge of the tablet inside the envelope.

Now by passing the tablet between rolls spaced apart a distance slightly less than the thickness of the packaged tablet the tablet will be subjected to crushing pressure inside the envelope. This crushing pressure is exerted through the flat walls of the envelope at a substantial distance from the seal. The pinch of the rolls therefore does not come upon the seal, but comes upon the flat sides of the tablet where no wrinkle or sharp bend is engaged by the rolls. The pinch of the crushing rolls is progressive, that is, it begins at one edge of the tablet and progresses as a narrow wave across the tablet to the opposite edge. I have found that by this method of crushing the envelope will stand up under quite high unit pressures which if applied across the full area of the tablet at one time would tend to injure the envelope.

The disposal of the tablet in the flat envelope provides considerable room about the periphery of the tablet and crushing of the tablet to less thickness permits the powdered material to expand into this peripheral space without subjecting the walls or the seal of the envelope to severe stresses.

The envelope may be torn open and the powder poured out.

The above method is highly desirable for such a material as coffee extract and for other materials which require to be dissolved in liquid. In other words, the above method and package is the solution not only of the coffee extract problem but of the broad problem of handling a material which must be kept from contact with moisture and air and which one wants to dissolve quickly.

The compactness, stability and high degree of subdivision of the material thus packaged is of great practical importance.

Now to acquaint those skilled in the art with the production of a package according to my invention, and the practice of the method for doing the same, I shall describe, in connection with the accompanying drawing, a specific embodiment of my invention.

The specific tabletted material or medium herein illustrated and described is concerned with providing the Army, Navy and Air forces and the like with beverage coffee. However, the invention is not to be confined to the specific medium nor the specific materials, steps and means herein described, as these are but illustrative of the invention and not intended to be limiting.

Figure 1:
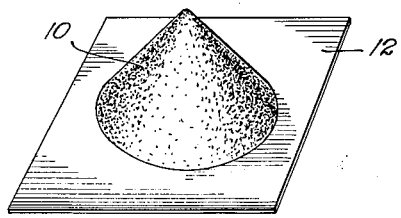
Figure 1 is an isometric view of a pile of the powdered material which it is desired to package.

Figure 1 illustrates a conical pile of powder 10 standing upon a sheet 12. The powder 10 is a granular or crystalline extract of the coffee bean, but coffee extract broadly is not my invention. The form of extract here employed consists of a brown powder preferably of a grain size approximately that of powdered table sugar. When subjected to the air it rapidly loses some of its flavor, hardens and becomes practically worthless. The powder, when crystallized and granulated to the fineness which I prefer, namely, approximately the grain size of powdered table sugar, has a density of approximately 0.18 in terms of grammes per cubic centimeter.

Figure 2:
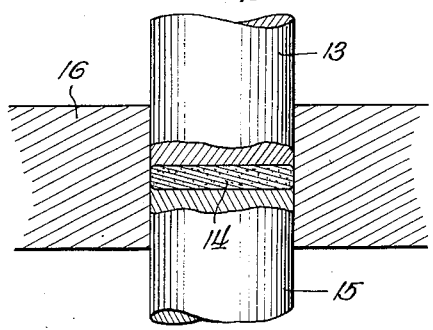
Figure 2 is a fragmentary vertical section through a tabletting machine.

This powder, such as 10, shown in Figure 1, is measured out in unit quantities which are compressed into tablets by any suitable tabletting machine. In one embodiment of my invention, I adopt three and one-half grammes as a suitable unit quantity, and this is compacted and tabletted into a tablet of approximately 1⅛ inch diameter by approximately 0.20 inch thick. In Figure 2 I have illustrated a tablet 14 as formed between the die members 13 and 15, with a surrounding die ring 16. The tabletting machine per se and method of tabletting of powdered materials are old and well known. Various materials may be formed into tablets by applying suitable pressure. Where necessary, a small amount of bonding material may be introduced. This is a practice well known in the art of forming tablets. However, such bonding material is not necessary in the case of coffee extract. The charge of 3.5 grammes is reduced by tabletting from a volume of 19 cubic centimeters which is that of the free powder to approximately 3.6 cubic centimeters resulting in a density of 0.96 gram per cubic centimeter. In other words, the powder has been compacted into one-fifth of the space it occupied as a free powder. These figures are illustrative of the nature of the steps.

Figure 3:
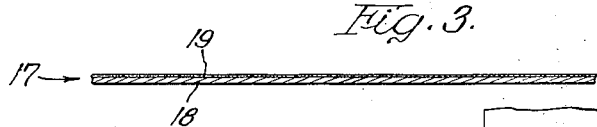
Figure 3 is a cross sectional view on a greatly enlarged scale, showing the sheet material which is employed for forming the envelope.

After the tablet has been produced, it is laid between two sheets of a suitable material, such as that illustrated in Figure 3. The sheet material 17 comprises aluminum foil 18 coated with a thin coating of "Pliofilm" 19. The coating such as 19 may be made of some cellulose derivative or synthetic or natural resin which will perform the service.

The metal foil 18 serves as a shielding material which, because of its metallic composition, will exclude light, resist atmospheric influences and moistures, and will resist other reagents or solvents to which the "Pliofilm" or other coating material might not be sufficiently resistive. The metal foil is relatively inelastic and form retaining. The aluminum foil might obviously be replaced by copper foil or zinc foil or tin foil or other metallic foil if found desirable. The coating 19 may be any one of a wide variety of suitable rubbers, rubber derivatives or synthetic or natural resins, gums, waxes and the like. However, I have found the rubber compound known as "Pliofilm" to be highly satisfactory for the service.

Figure 4:
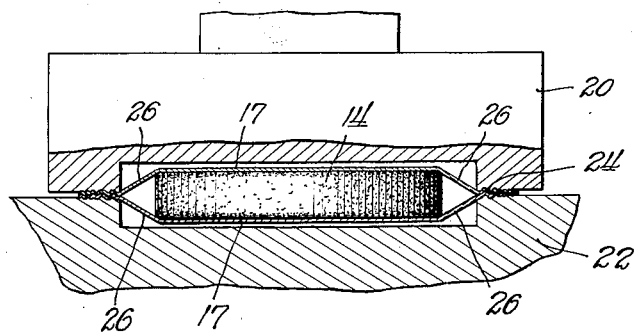
Figure 4 is a diagrammatic cross sectional view illustrating the method of disposing the sheet on opposite sides of the tablet and forming the peripheral seal.

The tablet 14, as is shown in Figure 4, is placed between sheets of envelope stock, such as illustrated in Figure 3, and then two die members 20 and 22 having registering recesses therein for receiving the tablet and sealing envelope stock without applying pressure to the tablet, are squeezed together upon the outer sides or aluminum foil sides of the two sheets to bond the margins together. The die members 20 and 22 are preferably heated to approximately 250° F. and sufficient pressure is brought upon the parts to bond together the "Pliofilm" sides of the sheets. The die faces may be disposed or formed upon cooperating drums or rollers. They may be parts of stationary and reciprocating dies. The particular mechanical method of bringing the dies together is not of the essence of the invention. Preferably the die faces are provided with a fine corrugation of the peripheral parts of the sheet, that is, the marginal parts where the sheets are to be bonded together.

Figure 5:
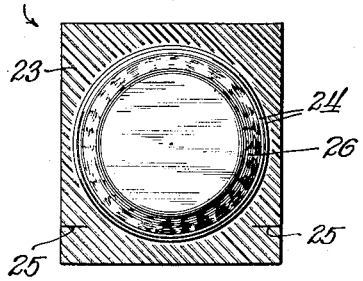
Figure 5 is a top plan view of the completed package, that is, the tablet enclosed within the envelope.
Figure 6:
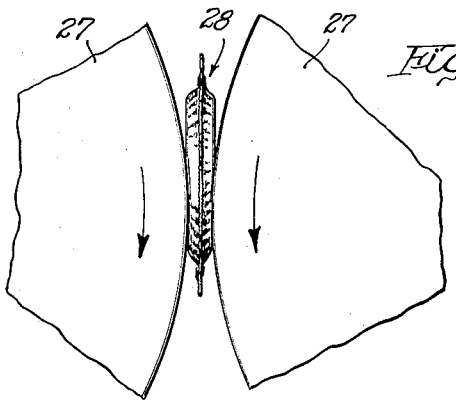
Figure 6 is a fragmentary, diagrammatic view illustrating the crushing of the tablet between rolls.

At the junction of the sheets and about the tablet 14 there are formed corrugating rings to provide circular corrugations indicated at 24 in Figure 5. The sheets in being pulled taut over the tablet and then offset into the median plane of the tablet provide a frustoconical pocket in each sheet. But this can be accomplished only by deformation of the sheet. That is to say, the frustoconical pocket must be formed either by a drawing operation of the central pocket part, or by the gathering of surplus about the margins. Drawing is undesirable because of the thinning and tendency to open cracks or pores and the weakening effect of a drawing operation.

Now by providing fine corrugations over the marginal parts of the sheets, the surplus stock about the central pocket is gathered, and at the same time firmly bonded by the biting effect of the corrugations of the dies.

The circular corrugations 24 form a definite line of demarcation between the gathered and somewhat puckered or wrinkled conical surface and the median marginal sealing portions which are, as above stated, corrugated and bonded. Thus the sheets are stretched flat over the flat side surfaces of the tablet and the bond lies in the median plane of the tablet. As a result, the marginal parts of the sheets about the seal of the rings 24 are completely bonded together, and, in addition, the ring corrugations 24 form a complete impervious seal immediately surrounding the space in which the tablet 14 is held. Since the circular corrugations 24 present substantially equal resistance to separation at any point, there is less tendency for any internal pressure to find a weak spot and to begin to separate or tear apart the bond between the sheets at such point. In other words, the ring seal 24 is made to prevent any additional area from receiving internal pressure, whereby disruption of the seal could be accomplished.

For the convenience of the user two cuts 25, 25 are made in opposite parts of the margin of the sheet as shown in Figure 5, to facilitate tearing off the seal and opening up the space in which the tablet is disposed.

While I have indicated the sealing operation in Figure 4 diagrammatically, it is to be understood that any suitable form of machine, such as a pair of cylinders with a plurality of dies brought into register or reciprocating mechanism may be used. The preferred method according to my invention is the use of continuously fed strips of envelope material entering between rotating cylinder dies, whereby the sealing may be accomplished by continuous operation upon opposing strips with feeding mechanism for feeding the tablets 14 into the successive recesses of the dies to seal the envelope sheets about them. The package shown in Figure 5 is, by way of example, about 1¾ inches wide by 1⅞ inches long, and about 3/32 inch thick. These dimensions are not intended to be limiting.

The sealing rings 24 are, in the specific example, about 1⅜ inches inner diameter and the tablet is about 1⅛ inches in diameter, whereby the conical wall 26 between the ring seal 24 and the edge of the tablet 14 is formed, this wall being drawn tight by the corrugating operation of the ring seal 24 and of the parallel rib corrugations 23 of the margin.

The tablet 14 keeps indefinitely within the envelope thus provided. This package has been tested under severe conditions of temperature and moisture, and found to stand up indefinitely. In order to cause the material of the tablet 14 to go into ready solution, it is necessary to break up the tablet. I have experimented with the tablets such as 14, and I find that if they are dropped into the liquid in the form of a tablet, it takes about one hour for them to go into solution.

Figure 7:
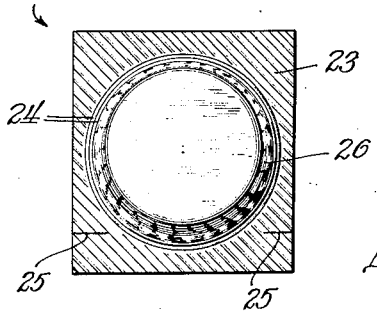
Figure 7 is a plan view of the package after passing through the rolls shown in Figure 6, and having the tablet therein crushed to powder.
Figure 8:
Figure 8 is an edge view of the package shown in Figure 7.

The package, as shown in Figure 5, is, according to my invention, passed through a pair of crushing rolls 27, 27, the space between which is a little less than the thickness of the package 28 shown in Figure 5. The bite of the rolls is only sufficiently less than the thickness of the package that the tablet 14 within the envelope is crushed into powder. That is to say, it takes very little displacement in the dimension of the thickness of the tablet to crush the same back to a powder. Crushing the same to a powder need only to break the bond between the particles and this is readily accomplished by the pressure of the rolls 27, 27 exerted through the sheet 17 on each side of the tablet forming the envelope. The package with the crushed tablet is shown in Figures 7 and 8, and it will be observed that the thickness of the package is less than it was before by a slight amount and that the powder has in some degree been forced into the annular space formed by the conical walls 26, 26 of the sheet at the margins of the solid tablet 14.

Crushing of the tablet somewhat increases the volume, but this crushing need be only sufficient to break the bond between the particles and the increase in volume is not such as to bring the material back into the loose state illustrated at 10 in Figure 1. The increased volume appears to be only that required to break the bond between particles. The particles of the crushed tablet interfit and hence the crushed tablet occupies very little more space than does the solid tablet before crushing.

I have made some measurements, and it appears that the density of the crushed tablet is still about three times as great as the density of the free powder. It may be more or less than that without at all losing the advantage of the present invention. While it is possible to package a loose powder between sheets bonded together somewhat as I have illustrated, the technical difficulties in doing so are relatively great and the results are distinctly inferior to the method of my invention.

I conceive that the teachings of the present invention apply to a wide range of materials which it is desired to package in air and moisture proof seals, and which it is desired to reduce to solution rapidly when the package is opened. The crushed tablet package in final form, as shown in Figures 7 and 8, has been tested under severe conditions. Coffee tablets enclosed in the seal above described and then crushed within the seal have been tested to withstand temperatures of 120° and moisture of 100% humidity. One of the features to be observed is that the material, such as coffee extract powder, should be tabletted under conditions which will render the tablet not too strong in crushing strength that crushing through the walls of the envelope cannot be successfully performed. In the present case, the powder was prepared by employing a highly volatile solvent for granulation, so that the granulated powder could be made sufficiently soft when tabletted that the tablet might be broken by pulverizing within the sealed package.

Also for best results, the crushing strength should be coordinated with the strength of the sheet stock of which the sides of the envelope are formed. Preferably the tablet is a circular disc with substantially parallel flat sides and of substantially uniform thickness. By advancing a circular disc edgewise through crushing rolls, the crushing pressure is applied first at a point where yielding begins most readily and then progresses as a narrow wave of pressure across the width of the tablet. This saves the envelope from damage. Obviously, there should be no wrinkles or creases in the envelope wall where crushing occurs, otherwise, the envelope may be cut or weakened so much as to be rendered porous.

Numerous deviations from the details which I have described will occur to those skilled in the art. However, I intend that they should be included within the compass of the invention as defined in the appended claims.

I claim:

1. Method of packaging material in powdered form for ready solution in a liquid which comprises tabletting the material from the powder form into flat sided tablets, enclosing the tablets with sheet stock which is air and moisture proof and which is thermobonding, sealing the tablets in flat sided envelopes by peripherally sealing said sheet stock about the tablets by heat and pressure and crushing the tablets into powder by applying mechanical pressure through the flat sided walls only of the containing envelopes within the confines of the peripheral seal whereby the seal is not subject to the crushing pressure.

2. Method of packaging comminuted material which comprises tabletting unit quantities of the material into self-sustaining flat tablets, disposing thermobonding sheets on opposite sides of the tablet, bonding said sheets by heat and pressure peripherally about the tablet to form a substantial flat sided hermetically sealed enclosure with the tablet inside and with the seal lying in substantially the median plane of the tablet, and outside the outline of the tablet, and thereafter applying progressive crushing pressure to the sides of the tablet through the flat sides of the enclosure.

3. Method of packaging powdered coffee extract which comprises tabletting the powder into self-sustaining substantially flat sided tablets, disposing a tablet flatwise between two sheets of metal foil having facing surfaces covered with a thermobonding rubberlike compound, bonding said sheets together peripherally with heat and pressure to form a flat sided air and moisture proof envelope about the tablet, and restoring the tablet to powdered form by progressively crushing it from one edge to the other without breaking the envelope.

4. Method of packaging a powdered material which comprises forming the material into flat sided self-sustaining tablets, disposing flat sheets of an air and moisture proof material upon the flat sides of the tablets, said material having facing surfaces of thermobonding material, drawing the sheet material taut over the flat sides of the tablets and bonding the margins of the sheets together by heat and pressure peripherally about the tablets, the bonded margins lying in substantially the median plane of the tablets, and reducing the tablet to comminuted form by pressure applied through the walls of the envelope in such manner as to progressively crush it from one edge to the other without breaking the envelope or the bonded margins thereof.

5. Method of packaging a powder which is subject to deterioration by contact with atmosphere which comprises tabletting the material into a dense flat sided tablet, disposing the tablet between two sheets of thermobonding material, pressing the margins of the sheets together about the tablet, sealing by thermobonding the sheets outside the margins of the tablet to provide a flat air-tight envelope, and breaking the cohesion of the particles of the tablet by progressively applying pressure thereto from one edge to the other through said side walls of the envelope without disturbing the seal.

6. Method of packaging a powder which comprises tabletting the powder into a dense compact tablet, laying sheets of thermobonding material upon the flat sides of the tablet, pressing together and thermobonding the margins of said sheets about said tablet to form a flat hermetic seal surrounding the edge of the tablet which lies between the planes of the flat sides thereof, and restoring the tablet to powdered form by progressively applying pressure to the flat sides thereof through the sheets, whereby the tablet is crushed inside the envelope with no substantial stress upon the seal.

7. Method of packaging a powder which comprises forming the powder into a tablet, positioning the tablet between two layers of air and moisture proof material, hermetically sealing together the juxtaposed portions of said layers about the periphery of said tablet and at a distance there-from to provide an expansion space, and restoring the tablet to powdered form by progressively applying pressure to the opposite sides thereof through said layers without breaking the seal therebetween whereby the tablet is crushed and a portion of the particles forming the same move into said expansion space.

8. A space saving hermetically sealed package of dry coffee extract, which is difficult to dissolve as a solid mass, and which hardens and deteriorates on exposure to atmosphere, said package comprising a relatively thin flat sided air and moisture proof envelope consisting of flat moisture proof sheets having margins laid flat together and hermetically sealed together to provide a flat pocket between them, and a mass of closely interfitting compacted cohesive particles of said extract in said pocket, said mass being in the form of dense, compact, flat sided tablet crushed in situ in said pocket, the compacted particles of which are broken loose from each other, whereby they are readily poured from the envelope when the envelope is opened, said compacted particles being readily soluble, said mass as a body being of less density and greater volume than the tablet before crushing and of substantially greater density and less volume than the uncompacted powdered material from which the tablet was formed.

JOSEPH MAURICE TRENEER.